United States Patent
Ku (12)

(10) Patent No.: US 6,969,173 B1
(45) Date of Patent: Nov. 29, 2005

(54) SPECTACLE FRAME WITH DETACHABLE ARMS

(75) Inventor: Otis Ku, Kowloon (CN)

(73) Assignee: Sun Hing Optical Manufactory Limited, Kowloon (CN)

( * ) Notice: Subject to any disclaimer, the term of this patent is extended or adjusted under 35 U.S.C. 154(b) by 0 days.

(21) Appl. No.: 10/924,448

(22) Filed: Aug. 24, 2004

(51) Int. Cl.$^7$ .............................................. G02C 5/16
(52) U.S. Cl. ...................... 351/113; 351/121; 351/153; 16/228
(58) Field of Search ....................... 351/110, 111, 113, 351/114, 119, 121, 153; 16/228

(56) References Cited

U.S. PATENT DOCUMENTS 6,779,887 B2 * 8/2004 Meiler ........................ 351/153

* cited by examiner

*Primary Examiner*—Huy Mai
(74) *Attorney, Agent, or Firm*—Alix, Yale & Ristas, LLP

(57) ABSTRACT

A spectacle frame includes a temple piece for attachment to a lens or fabricated upon a lens surround. An arm of the frame includes a spring bar extending from the arm and bearing against the temple piece. A hook attaches the temple piece to the arm and extends from one side of the spring bar to the other and detachably, pivotally connects the arm to the temple piece.

8 Claims, 1 Drawing Sheet

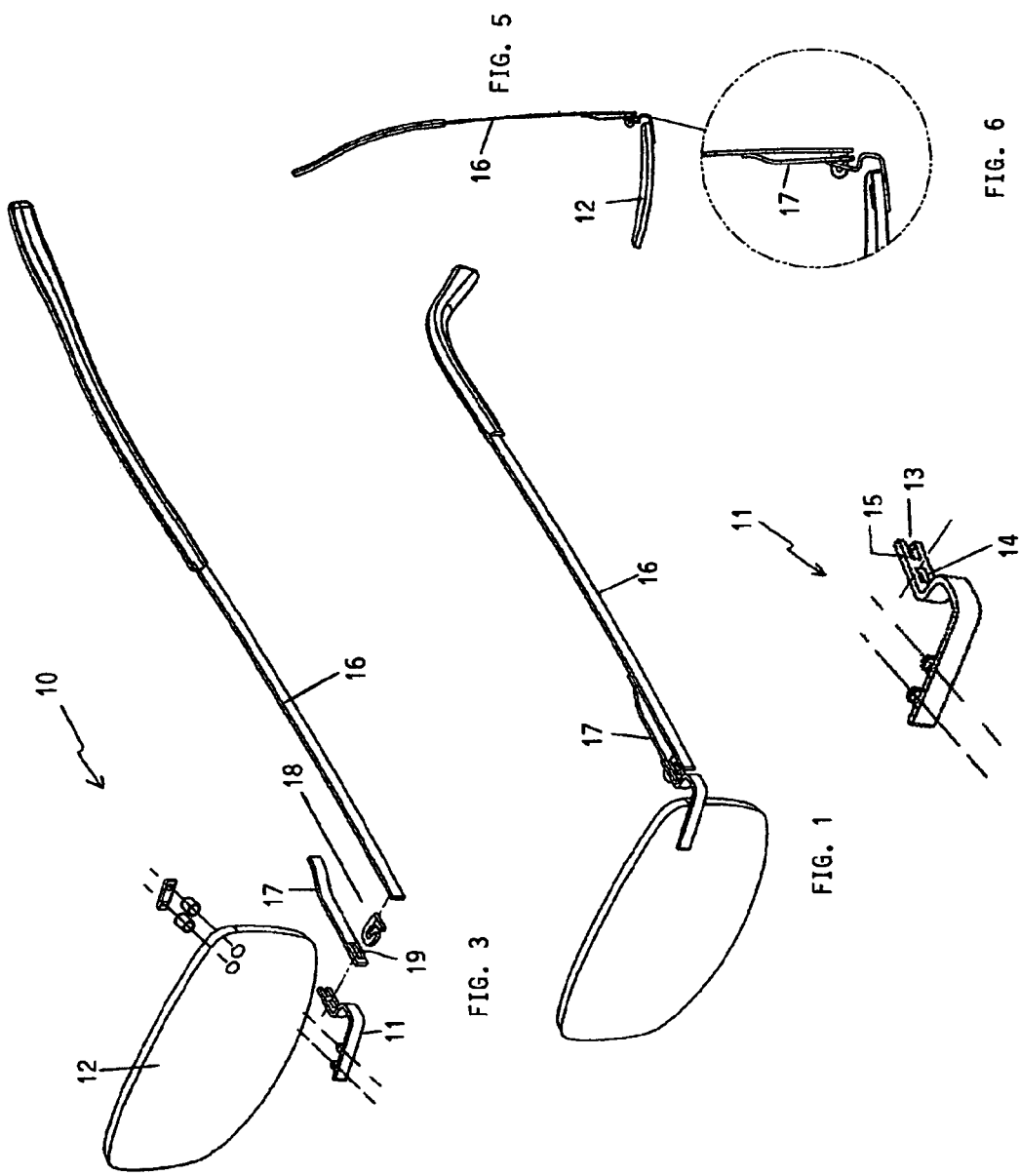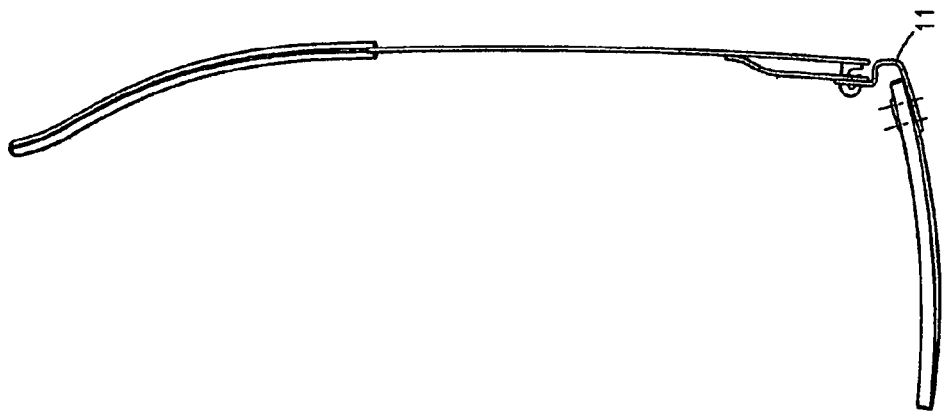

SPECTACLE FRAME WITH DETACHABLE ARMS

BACKGROUND OF THE INVENTION

The present invention relates to spectacle frames. More particularly, although not exclusively, the invention relates to a spectacle frame having arms that are pivotally attached to the lens or lens surround by a special detachable spring hinge.

Spectacle frames usually have arms permanently attached to the lens or lens surround by a hinge. Some hinges have springs built into them which bias the arms into a correct wearing position.

It might be desirable to have interchangeable arms—perhaps for the purpose of changing fashion, or easy self-replacement of damaged arms.

OBJECTS OF THE INVENTION

It is an object of the present invention to provide a spectacle frame having detachable spring-biased arms.

DISCLOSURE OF THE INVENTION

There is disclosed herein a spectacle frame, comprising:
a temple piece for attachment to a lens or fabricated upon a lens surround,
an arm including a spring bar extending from the arm and bearing against the temple piece, and
a hook biased by the spring bar to attach the temple piece to the arm and detachably, pivotally connecting the arm to the temple piece.

Preferably, the hook extends from one side of the spring bar to the other.

Preferably, the spring bar is disposed in spaced apart substantially parallel relationship with the arm.

Preferably, the spring bar comprises a slot through which the hook extends.

Preferably, the hook is attached permanently to the arm, and wherein the temple piece comprises an aperture and a recess separated from the aperture by a web, and wherein the hook extends through the recess and aperture to capture the web.

There is further disclosed herein an arm for detachable, pivotal interconnection with a temple piece of a spectacle frame, the arm comprising:
a spring bar extending from the arm to bear against the temple piece,
a hook affixed to the arm and extending to a position nearby the spring bar and by which the arm can be detachably, pivotally connected to the temple piece with the arm bearing against the temple piece to bias the arm to an in-use configuration with respect to the frame.

BRIEF DESCRIPTION OF THE DRAWINGS

A preferred form of the present invention will now be described by way of example with reference to the accompanying drawings, wherein:

FIG. 1 is a schematic perspective illustration of one lens of a spectacle frame having an arm attached thereto, FIG. 2 is a schematic plan view of the features shown in FIG. 1, FIG. 3 is a schematic parts-exploded perspective illustration of the features shown in FIGS. 1 and 2, FIG. 4 is a schematic perspective illustration of a temple piece forming part of the spectacle frame, FIGS. 5 and 6 are schematic views of the features shown in FIGS. 1 to 3, with the arm slightly deflected toward a closed position whereupon the spring bar is resiliently deflected upon interaction with the temple piece.

DESCRIPTION OF THE PREFERRED EMBODIMENT

In the accompanying drawings there is depicted schematically one side of a spectacle frame 10 as shown in FIGS. 1 to 6. Attached by threaded studs to a lens 12 is a temple piece 11. The temple piece 11 is bent around to comprise a rearward extending portion through which an aperture 14 passes. At the trailing edge of the temple piece 11, there is a recess 13. The recess 13 and aperture 14 are separated by a web 15.

Arm 16 of the frame 10 has braised to it a spring bar 17. The spring bar has a slot 19 near its forward end. A substantial length of the spring bar is disposed in parallel relationship with the arm 16 and is spaced slightly inwardly thereof.

Also braised to the arm 11 is a hook 18 that passes through the slot 19.

The arm 16 can be attached by the end-user to the temple piece 11 by passing the hook 18 about the recess 13 so that its tip can be fitted into the aperture 14. The hook would thereby capture the web 15. During this installation process, the spring bar 17 would bear against the trailing edge of the temple piece and deflect inwardly. Thereafter, the spring bar resiliently retains the hook against the web.

The arm 16 can then be pivoted closed like an ordinary pair of spectacles. As shown in FIGS. 5 and 6, as the arm commences its inward pivotal movement, the spring bar 17 deflects resiliently toward the arm 16 as it engages the trailing edge of the temple piece 11. Also, upon outward deflection of the arm 16 beyond the position depicted in FIG. 2, the forward tip of the spring bar 17 would bear against the temple piece 11 just forward of the aperture 14 to bias the arm toward the rest configuration depicted in FIG. 2.

The arm can be readily removed from the temple piece by pushing the forward end of the arm inwardly to deflect the spring bar and release the hook from the web.

It should be appreciated that modifications and alterations obvious to those skilled in the art are not to be considered as beyond the scope of the present invention. For example, the hook might be secured permanently to the temple piece and extend in the opposite direction through the slot 19, in which case the aperture 14, recess 13 and web 15 might be provided upon the arm 16. Also, the spring bar 17—instead of extending generally parallel to the arm 16 might project normally therefrom or at any other angle—as long as it bears resiliently against the temple piece to retain the hook against the web. Also, instead of providing a web between an aperture and a recess, a simple vertical pivot pin could be provided for cooperation with a hook or an eyelet.

What is claimed is:
1. A spectacle frame, comprising:
a temple piece for attachment to a lens or fabricated upon a lens surround,
an arm including a spring bar extending from the arm and bearing against the temple piece, and
a hook biased by the spring bar to attach the temple piece to the arm and detachably, pivotally connecting the arm to the temple piece.
2. The spectacle frame of claim 1, wherein the hook extends from one side of the spring bar to the other.

3. The spectacle frame of claim 1, wherein the spring bar is disposed in spaced apart substantially parallel relationship with the arm.

4. The spectacle frame of claim 1, wherein the spring bar comprises a slot through which the hook extends.

5. The spectacle frame of claim 1, wherein the hook is attached permanently to the arm, and wherein the temple piece comprises an aperture and a recess separated from the aperture by a web, and wherein the hook extends through the recess and aperture to capture the web.

6. An arm for detachable, pivotal interconnection with a temple piece of a spectacle frame, the arm comprising:

a spring bar extending from the arm to bear against the temple piece, a hook affixed to the arm and extending to a position nearby the spring bar and by which the arm can be detachably, pivotally connected to the temple piece with the arm bearing against the temple-piece to bias the arm to an in-use configuration with respect to the frame.

7. The arm of claim 6, wherein the spring bar is disposed in spaced apart substantially parallel relationship with the arm.

8. The arm of claim 7, wherein the spring bar comprises a slot through which the hook extends.

\* \* \* \* \*